(12) United States Patent
Acharya et al.

(10) Patent No.: US 9,582,603 B1
(45) Date of Patent: Feb. 28, 2017

(54) MANAGING PRELOADING OF DATA ON CLIENT SYSTEMS

(75) Inventors: Prashanth A. Acharya, Bellevue, WA (US); Jonathan B. Corley, Seattle, WA (US); Craig W. Howard, Seattle, WA (US); Harvo R. Jones, Seattle, WA (US); John K. Loendorf, Mercer Island, WA (US); Colm MacCarthaigh, Seattle, WA (US); Bradley E. Marshall, Bainbridge Island, WA (US); Imran Patel, Bellevue, WA (US); Lee B. Rosen, Seattle, WA (US); Ronald James Snyder, Jr., Everett, WA (US); Ryan F. Watson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1162 days.

(21) Appl. No.: 13/406,397

(22) Filed: Feb. 27, 2012

(51) Int. Cl.
G06F 15/16 (2006.01)
G06F 15/167 (2006.01)
G06F 17/30 (2006.01)

(52) U.S. Cl.
CPC .............................. *G06F 17/30902* (2013.01)

(58) Field of Classification Search
CPC  H04L 29/08072; H04L 29/06; H04L 29/0809
USPC ........................................................ 709/203
See application file for complete search history.

(56) References Cited

U.S. PATENT DOCUMENTS

| 6,493,758 | B1 * | 12/2002 | McLain ............ G06F 17/30899 707/E17.119 |
| 8,224,964 | B1 * | 7/2012 | Fredrickson et al. ........ 709/227 |
| 8,725,849 | B1 * | 5/2014 | Lloyd ............... G06F 17/30902 709/220 |
| 8,745,177 | B1 * | 6/2014 | Kazerani et al. ............. 709/220 |
| 8,805,950 | B1 * | 8/2014 | Landsman et al. ........... 709/213 |
| 2006/0200413 | A1 * | 9/2006 | Kessel et al. ................... 705/50 |

(Continued)

OTHER PUBLICATIONS

"Amazon Cloudfront," retrieved on Jul. 21, 2011, from http://web.archive.org/web/20110721174914/http://aws.amazon.com/cloudfront/, 5 pages.

(Continued)

*Primary Examiner* — Nicholas Taylor
*Assistant Examiner* — Chong G Kim
(74) *Attorney, Agent, or Firm* — Seed IP Law Group LLP (57) ABSTRACT

Techniques are described for managing preloading of data for client computing systems. A client computing system may provide one or more persistent data storage caches on local storage, such as to support a particular software program executing on the client computing system (e.g., a Web browser program, with the persistent data storage cache designed to store browser cookies and other data for later access by the Web browser program). Additional data may be stored in such a persistent data storage cache by preloading those data groups before they are requested by the client computing system (e.g., based on interactions of a user of the client computing system with an executing program on the client computing system). Particular data groups to preload may be selected in various manners, including to provide a specified type of minimum functionality to a client computing system based on the preloaded data groups.

28 Claims, 6 Drawing Sheets

(56) References Cited

U.S. PATENT DOCUMENTS

| | | | |
|---|---|---|---|
| 2007/0033569 A1* | 2/2007 | Davidson | G06F 17/30902 717/103 |
| 2007/0136533 A1* | 6/2007 | Church et al. | 711/137 |
| 2008/0201332 A1* | 8/2008 | Souders | G06F 17/30867 |
| 2008/0208789 A1* | 8/2008 | Almog | G06N 99/005 706/54 |
| 2008/0301300 A1* | 12/2008 | Toub | G06F 17/30902 709/227 |
| 2010/0115388 A1* | 5/2010 | Nguyen | 715/205 |
| 2010/0318745 A1* | 12/2010 | Wheeler et al. | 711/136 |
| 2011/0093790 A1* | 4/2011 | Maczuba | G06F 17/30902 715/745 |
| 2011/0238924 A1* | 9/2011 | Hampton | G06F 17/30902 711/138 |
| 2012/0084833 A1* | 4/2012 | Thomas | G06F 17/30867 726/3 |
| 2012/0084835 A1* | 4/2012 | Thomas | G06F 17/30867 726/3 |
| 2012/0246257 A1* | 9/2012 | Brown | G06F 17/30902 709/213 |
| 2012/0289147 A1* | 11/2012 | Raleigh et al. | 455/3.06 |
| 2012/0311020 A1* | 12/2012 | Brown | G06F 12/0862 709/203 |
| 2013/0041937 A1* | 2/2013 | Zhu | H04L 67/2847 709/203 |
| 2013/0151652 A1* | 6/2013 | Brech | 709/216 |

OTHER PUBLICATIONS

"Cache Manifest in HTML5," retrieved on Nov. 28, 2011, from http://en.wikipedia.org/wiki/Cache_manifest_in_HTML5, 5 pages.
"Gears (Software)," retrieved on Nov. 28, 2011, from http://en.wikipedia.org/wiki/Google_Gears, 4 pages.
"Indexed Database API," retrieved on Nov. 28, 2011, from http://en.wikipedia.org/wiki/Indexed_Database_API, 2 pages.
"Local Shared Object," retrieved on Nov. 28, 2011, from http://en.wikipedia.org/wiki/Local_Shared_Object, 7 pages.
"Web SQL Database," retrieved on Nov. 28, 2011, from http://en.wikipedia.org/wiki/Web_SQL_Database, 1 page.
"Web Storage," retrieved on Nov. 28, 2011, from http://en.wikipedia.org/wiki/Web_Storage, 5 pages.
Dhandhania, A., "HTML 5: Offline Application Caching," retrieved on Nov. 28, 2011, from http://www.webreference.com/authoring/languages/html/HTML5-Application-Caching/index.html, 2 pages.
Mahemoff, M., "'Offline': What does it mean and why should I care?," Aug. 2, 2010, retrieved on Jan. 10, 2012, from http://www.html5rocks.com/en/tutorials/offline/whats-offline/ , 11 pages.

* cited by examiner

MANAGING PRELOADING OF DATA ON CLIENT SYSTEMS

BACKGROUND

As the amount of data that is used by software programs on client systems has grown, the amount of storage capacity on client systems and the amount of bandwidth for connections to client systems has also increased in at least some situations. However, client systems and their users often still face delays and other problems in accessing particular data of interest.

DETAILED DESCRIPTION

Techniques are described for managing preloading of data for client computing systems in particular manners. In at least some embodiments, a client computing system may provide one or more persistent data storage caches on local storage of the client computing system, such as to support a particular software program executing on the client computing system, or instead to support various executing software programs. As one illustrative example, the described techniques may be performed to preload various data for a Web browser program executing on a client computing system, such as by using a persistent data storage cache for the Web browser program that is provided using one or more local storage devices of the client computing system. Such a persistent data storage cache for a Web browser program may, for example, be designed to store browser cookies and other data for later access by the Web browser program, such as to enable stateful interactions between the client computing system and a particular external domain (e.g., Web site) by storing information about prior interactions between the client computing system and the external storage domain.

The described techniques include storing additional data in such a persistent data storage cache local to a client computing system in at least some embodiments, such as to preload one or more data groups to the persistent data storage cache of the client computing system before those data groups are requested by the client computing system (e.g., based on interactions of a user of the client computing system with an executing program on the client computing system). Particular data groups to preload on a client computing system may be selected in various manners in various embodiments, including to provide a specified type of minimum functionality to the client computing system based on the preloaded data groups (e.g., temporarily while additional data groups are being retrieved, as a substitute for an enhanced type of functionality that would be provided if additional data groups were available, etc.). Additional details are included below related to the described techniques, and at least some of the described techniques are performed by automated operations of a data preload manager system in some embodiments, such as for a data preload manager system that is configured to support operations of one or more affiliated client computing systems and/or to support operations of one or more affiliated data source systems.

As previously noted, a persistent data storage cache that is used to store preloaded data may in some embodiments be specific to a particular software program executing on the client computing system, including in some embodiments a Web browser program. Such a persistent data storage cache may store data in various formats, such as by using key-value pairs, database entries, data objects specified in various formats, etc. Such a persistent data storage cache may also have various forms in various embodiments, including the following non-exclusive examples: using Web Storage functionality, also referred to as DOM Storage, optionally in combination with HTML5; using Java plugin-based storage or Java applets; using the Indexed Database API, also referred to as IndexedDB and WebSimpleDB; using Web SQL Database functionality; using the SQLite relational database management system; using Local Shared Objects ("LSO"), such as in combination with Adobe Flash technology; using Gears, also referred to as Google Gears; etc. Similarly, the data groups that are preloaded may have various forms in various embodiments, including based on types of storage and/or cache functionality that is used—non-illustrative examples of data groups include particular files, Web pages, data objects, database rows or other records, etc. Different types of underlying technology or functionality may also support different sizes of persistent caches, such as, for example, five or ten megabytes of storage per domain for Web Storage functionality and particular types of Web browser programs—in at least some embodiments, the data groups that are selected for preloading may also be based at least in part on an amount of storage space available in a persistent cache, as discussed in greater detail below. In addition, in at least some embodiments, a particular client computing system may provide multiple persistent data caches using one or more underlying technologies, such as to include multiple Web Storage-based data caches that are each specific to a distinct domain. Additional details related to Web Storage functionality are included in "Web Storage—W3C Candidate Recommendation 8 Dec. 2011", the World Wide Web Consortium ("W3C"), editor Ian Hickson, dated Dec. 8, 2011, which is incorporated herein by reference in its entirety, and which is also available at the time of application filing at www<dot>w3<dot>org<slash>TR<slash>2011<slash>CR-webstorage-20111208<slash> (where "<dot>" and "<slash>" are replaced with corresponding characters "." and "/").

Particular data groups to preload on a client computing system may be selected to provide a specified type of minimum functionality to the client computing system in at least some embodiments. Such minimum functionality types may be specified in various manners, such as by having defined configuration information for one or some or all client computing systems that is accessed and used by an embodiment of a preload manager system, by having an embodiment of a preload manager system that is designed and/or pre-configured to perform preloading as part of providing one or more specified types of minimum functionality, etc. The minimum functionality for a particular client system and data source may also be specified by different entities in different embodiments, such as one or more of a user associated with the client system, the data source (e.g., a particular Web site or company), and the data preload manager system. In addition, the preloaded data groups may enable a minimum level of functionality of a specified type to be provided to a client system and/or a user of the client system for various reasons, such as to provide a first set of data and/or capabilities while other data groups are being loaded that provide a second set of data and/or capabilities, to provide a first set of data and/or capabilities instead of a second set of data and/or capabilities that would otherwise be provided if possible, etc.

As a first illustrative example, a specified type of minimum functionality that is provided for a client computing system may include providing information for display or other presentation to a user of the client computing system (e.g., a Web page, an application user interface screen, etc.) that provides a minimum level of functionality, such as in a non-personalized manner that is not specific to the client system and/or the user. For example, a particular Web site or other data source may provide personalized Web pages to users when possible, such as to include information specific to the user (e.g., a name of the user; information about stored data of the user, such as profile information and/or previously submitted information; information about previous interactions of the user, such as to view particular objects or perform particular other actions; etc.), to include capabilities specific to the user (e.g., premium capabilities that are provided to only a subset of users who have enhanced privileges), etc. In such situations, the personalized Web page may also include some other default information that is provided to all users, or the Web site may instead have a default Web page that has distinct information (e.g., that includes a login screen) that is provided to users for whom a personalized Web page is not available (e.g., based on an identity of the user not being known). For example, a Web page or other grouping of data may in at least some embodiments include multiple distinct data elements, such as that form a Web page when combined, and with each data group corresponding to one or more such data elements—if so, a personalized Web page may include one or more personalized data elements, whether for use in addition to or in place of one or more data elements of a default Web page. In such situations, the preloaded data groups for a particular client system may include the data elements for one or more such default Web pages or otherwise include default information that is provided to all users. If so, the default Web pages or other default information may be presented to the user of the client system in various situations, such as if access is not currently available to the Web site (e.g., based on the Web site being down or otherwise unavailable, based on the client system lacking current connectivity to retrieve data groups from external sources, etc.), or temporarily until a displayed default Web page can be updated with additional personalized information that is downloaded while or after the default Web page rendering or other presentation occurs. Non-personalized or otherwise default data groups may further be preloaded for other types of presentations than Web pages in at least some embodiments, such as for a media streaming site (e.g., a Web radio site) that includes both personalized and non-personalized channels or other data sources.

As a second illustrative example, a specified type of minimum functionality that is provided for a client computing system may include preloading a subset (e.g., an initial portion) of one or more data files or other groupings of data, such as may be used for display or other presentation to a user of the client computing system (e.g., an audio and/or video file, referred to herein as an audio/video file, such as for download and/or streaming). For example, the initial portions of multiple audio/video data files may be preloaded on a client system, such as by preloading one or more data groups for each such data file—such preloaded data groups may then be used to act as a data buffer for a data file that is selected (e.g., by a user of the client system), so that the initial portion of the data file is locally available to be presented (e.g., substantially immediately) while additional data groups corresponding to some or all of the remainder of the data file are downloaded. Thus, in such situations, the one or more data groups for the initial portion or other subset of a data file and the additional data groups for the remaining portions of the data file may in combination form the entire data file, such as with each such data group including a distinct portion of the data file that is not included in any other such data groups, with some amount of redundancy among at least some of the data groups, etc. In at least some such embodiments, a size of the data group(s) for the initial portions that are preloaded may be based at least in part on providing a minimum type or amount of functionality (e.g., at least the initial 1 minute or 5 minutes or 5 hours), optionally based at least in part on factors such as current or predicted connection bandwidth that is available for the client system to download the remaining data portions.

As a third illustrative example, a specified type of minimum functionality that is provided for a client computing system may include preloading a subset (e.g., a header or other metadata, an initial portion, etc.) of one or more data files or other groupings of data, such as based at least in part on DRM ("Digital Rights Management") information or other security-related information that is associated with a data file. For example, at least header or other metadata information that includes DRM-related information for one or more data files may be preloaded on a client system, such as by preloading one or more data groups for each such data file—such preloaded data groups may then be used to enable some initial operations to be performed for a data file that is selected (e.g., by a user of the client system), such as to perform a DRM-related access determination to verify that the client system and/or current user are authorized to have access to additional data groups corresponding to some or all of the remainder of the selected data file. The additional data groups for the selected data file may be downloaded while the initial operations are being performed, or instead the download of the additional data groups may be prevented until the authorization for those additional data groups is verified. Such additional data groups may optionally include additional security-related information in at least some embodiments and situations (e.g., with a lower level or type of security), such as to prevent intercepted copies of the additional data groups from being used without satisfying the additional security-related measures. Thus, in such situations, the one or more data groups for the initial portion or other subset of a data file and the additional data groups for the remaining portions of the data file may in combination form the entire data file, such as with each such data group including a distinct portion of the data file that is not included in any other such data groups, with some amount of redundancy among at least some of the data groups, etc. In at least some such embodiments, a size of the data group(s) for the initial portions that are preloaded may be based at least in part on providing a minimum type or amount of functionality (e.g., to verify access authorization), optionally while blocking access to some or all other data groups (e.g., some or all of the content of the data file). It will be appreciated that these illustrative examples are provided for the sake of understanding, and that the described techniques are not limited to use with one or more of the illustrative examples—thus, other types of minimum functionality levels may be specified and used in other embodiments.

In at least some embodiments, particular data groups to preload for a client computing system may be stored on one or more devices proximate to the client system, whether instead of or in addition to storing those data groups on a local persistent cache or other local storage of the client system. For example, particular data groups may be stored on a proximate device for one or more of the following non-exclusive reasons: the client system does not have any local storage; the client system does not have any local persistent caches; the client system does not have space in a local persistent cache or otherwise on local storage; the client system is not currently available (e.g., is turned off, does not currently have a data connection, etc.); the proximate device has one or more advantageous capabilities (e.g., a faster data connection than the client system, a local storage space than the client system, etc.); as an intermediate step, such as to first store the data groups on the proximate device and subsequently to store those data groups in a local persistent cache on the client system, such as by sending some or all of those data groups to the local persistent cache from the proximate device rather than from a remote external data source; to enhance later access of those data groups by the client system, such as to enable the client system to later retrieve those data groups from the proximate device when they are requested on the client system; etc. A proximate device may be near to a client system in one or more manners, such as in a geographic proximity sense (e.g., to be near the client system in the physical world, such as to be located in the same room, building, multi-block area, city, zip code, state, country, etc.), and/or in a network proximity sense (e.g., to be near the client system within one or more networks, such as to be on the same network or sub-network; to be within a defined measure of network distance, such as based on one or more of inter-communication latency, inter-communication transit time, number of inter-communication hops; etc.). In addition, a proximate device may have various forms, such as a network storage device or a storage network, a portable storage device that is located at or near the client system to enable attachment or other connection, a proxy device for the client system, an edge server device for a content delivery network, etc.

In some situations, a content delivery network ("CDN") may include multiple edge server devices that are located in different portions of one or more networks, and are able to each cache various data for use by clients that are near the edge server device or otherwise associated with the edge server device—if so, a particular edge server device may be selected and loaded with particular data groups for a particular client system in at least some embodiments and situations. The selection of a particular edge server device or other proximate device may be performed in various manners in various embodiments, including in a manner specific to a client system and/or a user of the client system based on current and/or predicted information about the client system and/or user (e.g., geographic location, network location, data connection bandwidth, data connection availability, local storage capacity, persistent cache capacity, etc.). For example, the preload manager system may predict a future location of a client system at a future time at which the client system may request access to particular data groups, and store at least those data groups on one or more edge server devices proximate to that predicted future location. In addition, in at least some embodiments, an embodiment of the data preload manager system that is performing some or all of the described techniques may be part of or otherwise affiliated with a particular content delivery network, such as to enhance operation of the content delivery network in providing data groups to client computing systems. Non-exclusive examples of content delivery networks include Akamai Technologies, Amazon CloudFront, BitTorrent, CloudFlare, Limelight Networks, PeerCast, etc., and can be provided using various content networking technologies.

The use of the described techniques may provide various benefits in various embodiments and situations, including to provide faster access of a client system to particular data groups, to provide at least a minimum level of functionality to a client system in particular situations (e.g., in the absence of a data connection, while waiting for additional data groups to download, etc.), to provide enhanced capabilities to a client system and/or external data source (e.g., to provide enhanced security with respect to data of interest, such as by not downloading some or all such data until other initial data groups are used to authorize access), etc. Additional benefits are discussed elsewhere herein.

For illustrative purposes, some embodiments are described below in which specific instances of data preloading are provided in specific ways, including with respect to specific types of client systems, specific types of data, and specific types of minimum functionality levels that are supported. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

Figure 1:
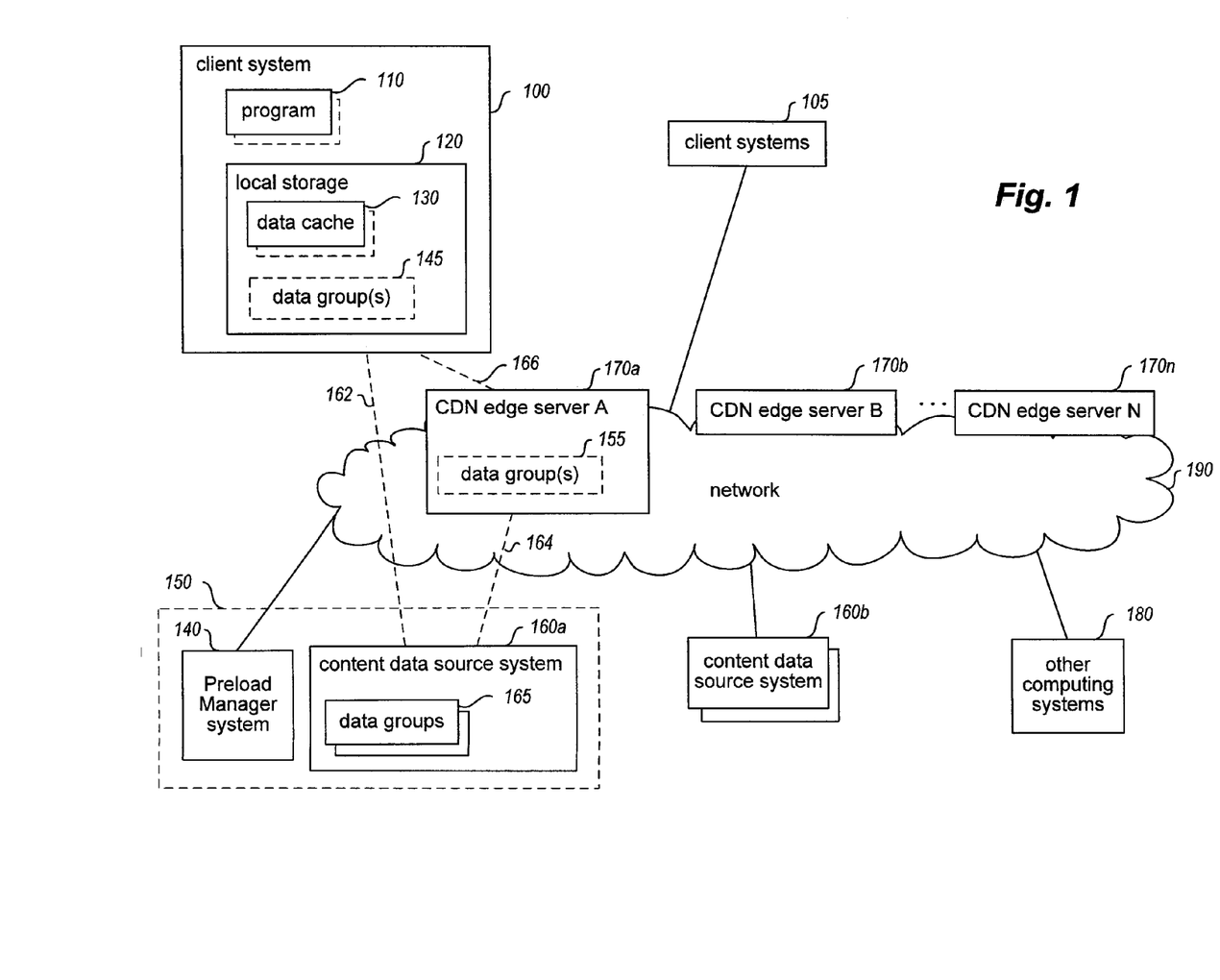
FIG. 1 illustrates an example embodiment of a data preload manager system that manages preloading of data for supported client computing systems.

FIG. 1 is a network diagram that illustrates an example embodiment of a data preload manager system that manages preloading of data for supported client computing systems. In particular, in the illustrated embodiment, a preload manager system 140 is illustrated, and it performs automated operations to support the preloading of data on one or more example client computing systems 100 and 105. In addition, one or more content data source systems 160 are illustrated and are available to provide various data to client systems, including multiple data groups 165 provided by the example content data source system 160a. In addition, various CDN edge server devices 170a-170n are also illustrated at different locations within a network 190, and one or more other computing systems 180 are also illustrated and may be configured to provide various additional types of functionality (e.g., to manage operations of a network of the edge server devices 170 of the content delivery network).

In the illustrated example, the preload manager system 140 may optionally be integrated together as part of a single system 150 with a particular content data source system 160a, such as to support operations of that content data source system and to be provided using one or more computing systems (not shown), while in other embodiments the preload manager system 140 may execute on one or more computing systems that are separate from any such content data source systems 160, including in a manner to optionally support one or more such separate content data source systems. In yet other embodiments, the preload manager system 140 may instead be integrated as part of the content delivery network to support its operations, as part of one or more client systems 100 and/or 105 to support their operations, as part of a remote component that is part of or otherwise supports a program 110 executing on one or more client systems (e.g., as part of a server-side portion of a Web browser program that includes client-side portions on the one or more client systems), etc.

In the illustrated example, the client system 100 is executing one or more programs 110, such as a Web browser program and/or another type of program. The client system 100 in this example further includes one or more local storage devices that provide local storage 120 for the client system 100, with a portion of the local storage 120 being used in this embodiment to provide one or more persistent data caches 130, and to optionally store other data groups 145 (e.g., to store Web pages and other data objects that are currently or previously in use by the programs 110). It will be appreciated that the client computing system 100 may include various other components that are not illustrated in FIG. 1 for the sake of brevity, as discussed in greater detail with respect to FIG. 3 and elsewhere.

In the illustrated embodiment, the preload manager system 140 may receive an indication to preload data on the client computing system 100, such as in response to a request from a program 110 on the client computing system, in response to a request from a particular content data source system 160, etc. In this example, the preload manager system 140 obtains information about the data cache 130 available on local storage 120 of the client computing system, such as to determine an amount of storage capacity that the data cache may hold, and selects one or more data groups to store in the data cache 130. As discussed in greater detail elsewhere, the preload manager system 140 may in some embodiments make the selection of particular data groups to preload based on one or more of various factors, including information about previous activities of the client computing system and/or of a user of the client computing system, on a defined type of minimum functionality level to be provided to the client computing system, etc. After the preload manager system 140 selects one or more such data groups to preload to the client computing system 100, the system 140 in the illustrated example initiates a preloading of those data groups on the data cache 130, such as by initiating interactions 162 between the content data source system 160*a* and the client computing system 100, although in other embodiments the system 140 may instead directly transmit or otherwise provide (not shown) some or all of the selected data groups to the client system. After the selected one or more data groups are preloaded to and present in (not shown) the data cache 130, a program 110 may later request and access some or all of those preloaded data groups (e.g., in response to an interaction by a user, not shown, of the client system 100), such as to use those preloaded data groups as part of information presented to a user or instead in other manners. In other embodiments, the data groups selected for a particular client system may come from multiple distinct content data source systems 160, or alternatively the preload manager system 140 may directly store at least some such data groups.

In addition, in some embodiments, the described techniques may further use one or more edge server devices 170 to assist the preloading of data for particular supported client computing systems. In particular, as discussed in greater detail elsewhere, such edge server devices may be located at different locations in network 190, and may each store at least some available data groups to assist in providing data groups to particular clients (e.g., to proximate client computing systems) as appropriate. Thus, in some embodiments and situations, the client computing system 100 may have previously been interacting with a particular edge server device, such as edge server device A 170*a* in the illustrated example. In such situations, the preload manager system 140 may perform interactions to cause selected data groups to be loaded onto one or more particular edge server devices to facilitate access of those selected data groups to particular client computing systems. In particular, in this example, the system 140 may initiate one or more interactions 164 to cause particular data groups 155 (e.g., some or all of the data groups 165) to be stored on the edge server A device to assist in supporting client computing system 100, with such data groups 155 optionally having an overlap with the selected data groups to be preloaded to the data cache 130 (e.g., to be a superset of the selected data groups, to be a subset of the selected data groups, etc.). Such interactions 164 may be initiated instead of or in addition to the interactions 162 to preload the selected data groups directly in the data cache 130. If the edge server device A is in use by the client computing system, the system 140 may further initiate one or more additional interactions 166 between the client computing system 100 and the edge server device A to cause some or all of the selected data groups to be preloaded in the data cache 130 from the edge server A device. In other embodiments, the client computing system 100 may be instructed to interact with the edge server device to facilitate preloading of data groups on the client computing system 100, such as even if the client computing system 100 was not previously interacting with that edge server device. In yet other embodiments, the data groups 155 may not be preloaded to the local storage 120, such that the client system 100 may later retrieve particular data groups when they are requested or otherwise used (e.g., by first attempting to obtain those particular data groups from the stored data groups 155 on the edge server device A if possible, and otherwise interacting with one or more particular content data source systems 160 to retrieve the particular data groups).

In a similar manner, the preload manager system 140 may perform additional interactions to initiate preloading of selected data groups on other client systems 105, whether the same data groups selected for the client computing system 100, or instead other data groups (e.g., other data groups selected in a manner specific to other client computing systems 105). In addition, in embodiments in which edge server devices are in use, one or more of the other client computing systems 105 may be interacting with other edge server devices, such as if one or more of the client computing systems 105 are interacting with a distinct edge server device B 170*b*.

A particular content data source system 160 may have various forms and may store various types of data in various embodiments. For example, a particular content data source system 160 may be a server computing system that executes one or more software programs (not shown) to manage access to available data groups, such as a Web server program to provide access to Web pages and other data to support one or more Web sites. Alternatively, a particular content data source system 160 may in some situations be a network storage device that stores data for access by other programs executing on other computing systems, such as to store various audio/video files that include digital media content.

Client computing systems may also have various forms in various embodiments, including desktop or other fixed-location computers, laptops and tablets and other mobile computers, smart phones and other cell phones, PDAs and other electronic organizers, Internet appliances, portable or fixed-location gaming systems, television-based systems (e.g., using set-top boxes and/or personal/digital video recorders), and various other consumer products that include appropriate communication capabilities. With respect to types of storage local to a client computing system that may be used to provide a persistent data storage cache or otherwise to store preloaded data, a first example of a local storage mechanism type for a client computing system includes at least a portion of a local non-volatile storage device for the client computing system (e.g., a storage device that is attached to or otherwise part of the client computing system), such as a portion of the local storage device that may optionally be dedicated for use as a storage cache for a particular software program executing on the client computing system and/or for a particular user of one or more software programs executing on the client computing system. As a second example of a storage mechanism type local to a client computing system that may be used, at least a portion of a distributed file system may be used as a storage mechanism, such as for a distributed file system that is provided in part by the client computing system (e.g., using one or more local storage devices of the client computing system) and in part by one or more other associated computing systems—when the described techniques are used to manage data for a software program executing on the client computing system, the other associated computing systems may in some embodiments be other computing systems that also are executing that software program, whether in a distributed manner with the client computing system or by each independently executing a copy of the software program. In some embodiments, other types of storage mechanism types local to a client computing system may be used, including a virtual local block storage device that is mounted to the client computing system or is otherwise accessible as a local storage device, but whose data is stored at least in part on one or more remote systems. In addition, a local storage device for a client computing system may, for example, be permanently attached to a client computing system (e.g., a hard disk internal to the client computing system) and/or temporarily attached to the client computing system (e.g., a USB-based flash key or drive, a portable external hard disk, a magnetic tape that may be used in a tape drive of the client computing system, etc.).

The use of particular data groups by a program 110 may be initiated in various manners in various embodiments and situations. For example, in some cases an application program 110 may have one or more users, and may request data groups in response to user interactions with the application program, including in situations in which the application program provides a publicly accessible service to such users. Such users may, for example, be local to the client system 100 (e.g., to interact with I/O devices, not shown, of the client system 100), and/or may be remote from the client system 100 (e.g., may use other computing systems 180 to interact with the program 110 over the network(s) 190). In addition, the data groups that are accessed, stored and used may have various forms in various embodiments and situations, including particular files, Web pages, data objects, database rows or other records, etc. The network(s) 190 of FIG. 1 may include any appropriate network or combination of networks, including an intranet, the Internet, one or more private networks with access to and/or from the Internet, a cellular network, a local area network, or any other such network or combination thereof. Communication over the networks may be enabled by wired or wireless connections and combinations thereof.

In other embodiments, the data preload manager system 140 may perform additional techniques, such as to further facilitate access of the preloaded data groups for a program 110 by retrieving and providing requested preloaded data groups to the program 110. In addition, the data preload manager system 140 may include software instructions that execute on one or more server computing systems to program or otherwise configure the server computing system(s) to perform some or all of the described techniques, such as to program one or more hardware CPU processors (not shown) of the server computing system(s). Furthermore, in at least some embodiments, a defined data storage management policy may be used to specify aspects of how to perform and/or maintain storage of particular preloaded data groups, including to optionally be defined to specify a particular minimum level of functionality to support or otherwise to be specified in accordance with a particular specified minimum level of functionality. If so, the preload manager system 140 may access and use such a defined policy to control or otherwise influence at least some of the automated operations of the preload manager system. Additional details related to one example embodiment of defined data storage management policies that may be used are included in U.S. patent application Ser. No. 13/350,658, filed Jan. 13, 2012 and entitled "Managing Data Storage Using Storage Policy Specifications", which is hereby incorporated by reference in its entirety.

Although the foregoing example embodiment of FIG. 1 is described with respect to a data preload manager system that provides various types of functionality for an associated content data source system in conjunction with one or more client systems that each may have one or more users, it will be appreciated that various other embodiments may exist. For example, in at least some embodiments and situations, a client system and/or a user may represent an organization or other group (e.g., a company) with multiple people instead of an individual person. In certain embodiments, the data preload manager system and optionally a content delivery network may each operate according to one or more fee-based structures or agreements. For example, access to some or all of the described techniques may in some embodiments be provided in a fee-based or other paid manner to a provider or operator of the preload manager system 140 and/or to at least some client systems that use described techniques of the preload manager system 140. As one example, clients of the data preload manager system may pay one-time fees, periodic (e.g., monthly) fees and/or one or more types of usage-based fees to use functionality provided by the data preload manager system. Fees may be based on one or more factors and activities, such as indicated in the following non-exclusive list: based on the quantity of data to be stored, such as to initially store the data (e.g., as a one-time fee), to maintain ongoing storage and/or retrieval access to the data (e.g., a monthly fee), etc.; based on usage of the data, such as a number of data transfers in a particular period of time; based on content or other characteristics of the particular data groups to be stored and/or retrieved (e.g., digital media content versus textual content); based on a manner in which the data is transferred (e.g., network bandwidth resources consumed by the initial or subsequent transfers of the data, number of computing systems to or from which the data is transferred, etc.); etc.

Figure 2A:
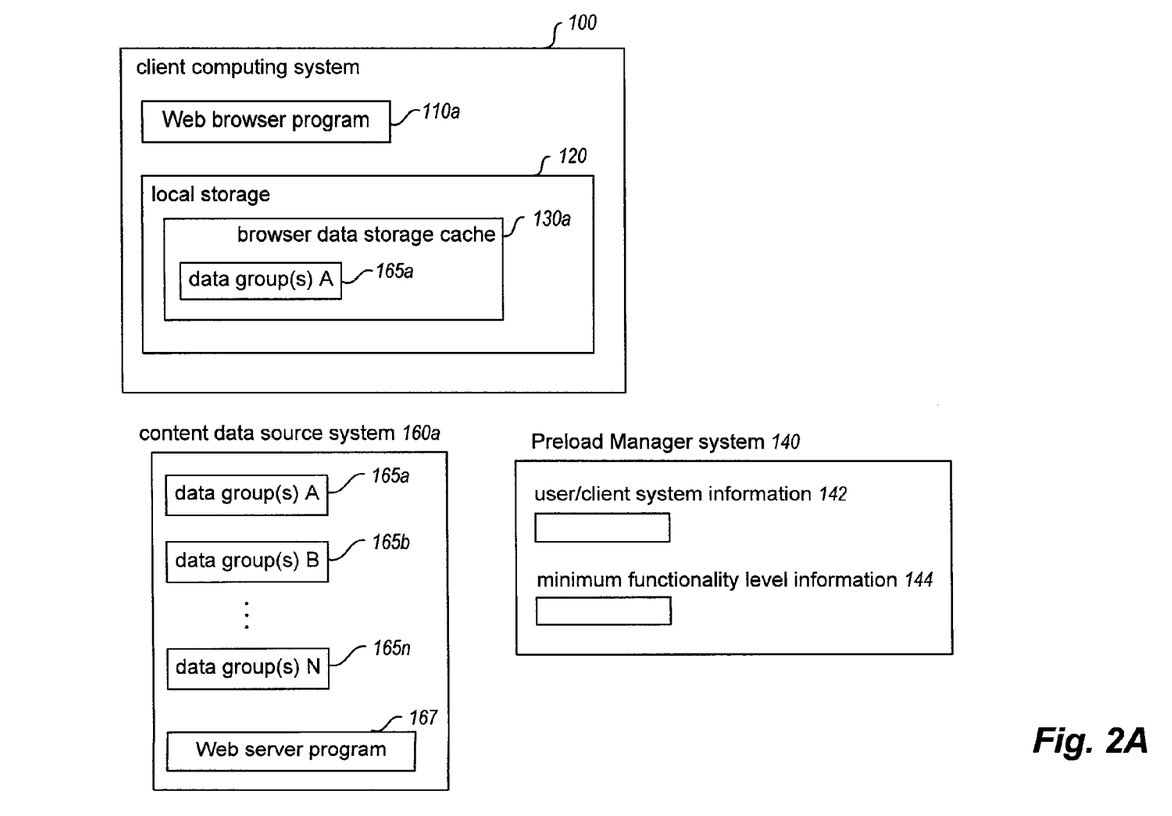
FIGS. 2A-2B illustrate examples of managing the preloading of one or more data groups in particular manners in particular situations.
Figure 2B:
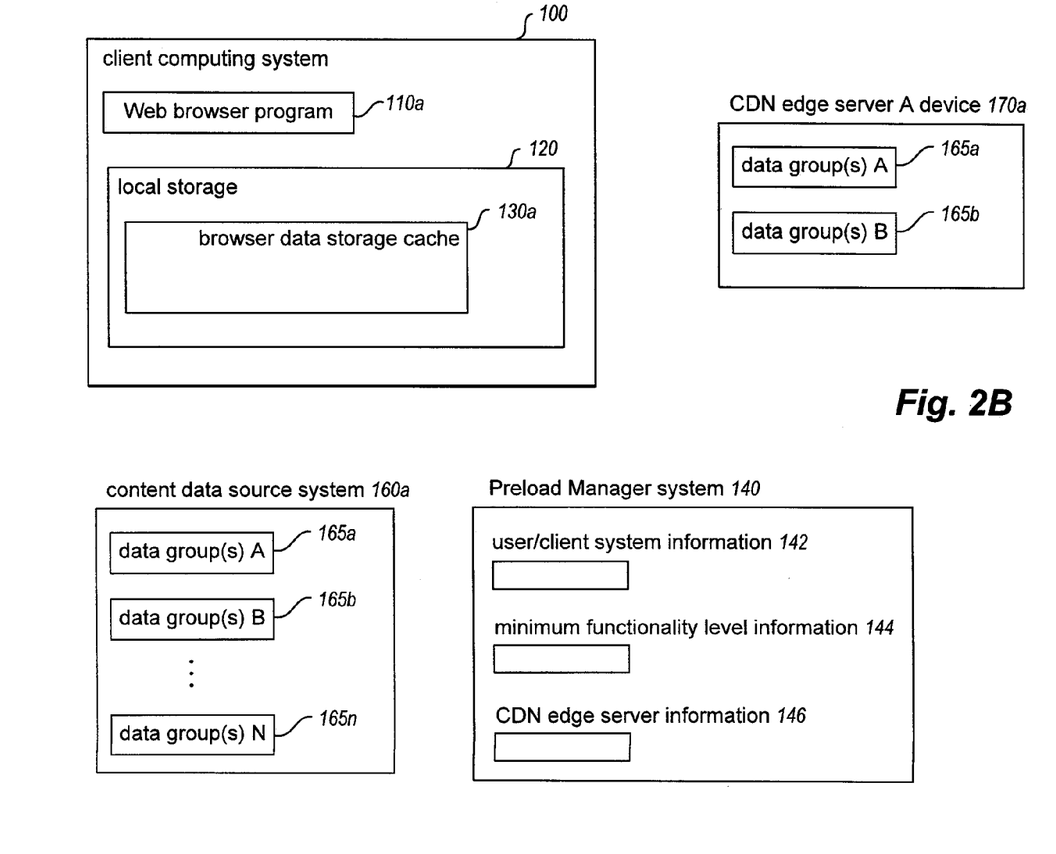

FIGS. 2A-2B illustrate examples of managing the preloading of one or more particular data groups for a client computing system in particular manners in particular situations. In particular, with respect to FIG. 2A, the figure illustrates some of the systems discussed with respect to FIG. 1, and provides additional details related to a particular example of use of those systems.

In the example of FIG. 2A, the client computing system 100, the preload manager system 140, and the content data source system 160a of FIG. 1 are illustrated, although some elements of FIG. 1 (e.g., one or more intervening networks 190) are not illustrated for the sake of brevity. The client computing system 100 of FIG. 2A is executing a particular program 110 in this example, which is a Web browser program 110a. In addition, the data cache(s) 130 of the client system 100 include a browser data storage cache 130a in FIG. 2A that is specific to the Web browser program. Additional details are also provided in the example of FIG. 2A regarding the content data source system 160a, including to illustrate that the data groups 165 of FIG. 1 are separated into N distinct groupings that each includes one or more data groups A-N, as well as to show an executing Web server program 167 that the system 160a uses in this example to serve Web pages and other data for one or more Web sites using the various data groups 165.

The preload manager system 140 of FIG. 2A is also illustrated with additional information 142 and 144 in this example, which it uses as part of performing its automated preloading operations in the example of the FIG. 2A. The additional information includes information 142 that is specific to particular client computing systems and/or users (e.g., with information specific to client system 100 and/or one or more users, not shown, of client system 100). The additional information further includes information 144 in this example to specify a particular type of minimum functionality level to be provided, although in other embodiments the preload manager system 140 may be designed or configured to support one or more particular types of minimum functionality levels without using such specified information. In some embodiments and situations, the information 144 may include instructions or other information about particular data groups to preload in particular situations—for example, with respect to FIGS. 2A and 2B, the information 144 may specify (for example) to always preload data group(s) A for any client system, to always preload data group(s) A for one or more particular client systems, to preload data group(s) A if specified criteria are satisfied, etc. The minimum functionality level information 144 may further be specified in some embodiments using one or more defined data storage management policies, as described elsewhere.

In this example of FIG. 2A, the preload manager system 140 determines to preload a first grouping 165a of one or more data groups A to the client computing system 100 for storage in the browser data storage cache 130a. As discussed in greater detail elsewhere, the minimum functionality level information may have various forms, and may be used to select the example data groups A in various manners.

As one example, the data groups 165 on the content data source system 160a may include video/audio data files to be streamed to particular client systems upon request, and the data groups A may include an initial portion (or other subset) of one or more of those audio/video files, such as to allow the initial portion of the audio/video file(s) to be presented on the client system 100 using the data groups A, optionally while additional data groups corresponding to the audio/video file(s) (e.g., some or all of data groups B through data groups N) are being downloaded to the client system 100 from the content data source system 160a.

As another example, the data groups 165 on the content data source system 160a may include information for use in rendering various Web pages that may be personalized to particular users and client computing systems, such as by constructing various Web pages using a default set of information (e.g., stored in data group(s) A) that is available to any user and client computing system, and with additional data groups (e.g., some or all of data groups B through data groups N) corresponding to information specific to particular users and client computing systems. Such information specific to a particular user and/or client system may include, for example, information about recently viewed items or other information regarding prior interactions by the user or client computing system, information corresponding to premium functionality that is available to only certain users and client computing systems, information corresponding to recommendations and/or advertisements that are personalized to the particular user or client computing system, etc. In such situations, the preloaded data groups A may provide a non-personalized or other default level of functionality to any user of the Web site, and with that default functionality available to a user of the client computing system 100 from the preloaded data group(s) A even in situations in which the client computing system cannot access additional personalized data groups at a time of presentation to the user (e.g., if connectivity is temporarily unavailable between the client computing system 100 and the content data source system 160a).

As yet another example, some data files (or other groups of content) may include various security information, such as DRM information. If so, the selected data groups A may include portions of those content groups that include information for any DRM constraints in use, such as to enable the Web browser program 110a or other program on the client system 100 to access those data groups A and initiate an initial determination of whether access rights are available to the underlying data files—if so, the program on the client system 100 may further initiate access to other data groups from the content data source system 160a that correspond to those data files. It will be appreciated that a variety of other types of minimum functionality level information 144 may be specified and used, and that a particular subset of data groups may be selected for preloading in other manners in other embodiments.

FIG. 2B continues the example of FIG. 2A, and includes various information similar to that illustrated in FIG. 2A. In particular, in the example of FIG. 2B, the client computing system 100 is again illustrated with an executing Web browser program 110a and a browser data storage cache 130a on local storage 120, although in the illustrated example of FIG. 2B, there are not any selected data groups that have been preloaded in the cache 130a. In addition, in the example of FIG. 2B, the content data source system 160a is again illustrated with the various data groups 165a-165n, but in this example does not include an executing Web server program, such as if the content data source system 160a is a network storage device that provides stored data groups 165 upon request from other remote executing programs.

In addition, in the example of FIG. 2B, a particular edge server device is illustrated, which is edge server device A 170a of FIG. 1. The preload manager system 140 of FIG. 2B also includes information 142 and 144 in a manner similar to that of FIG. 2A, but also includes additional information 146 corresponding to one or more edge server devices that are available for use as part of the preloading of data for particular client computing systems. In particular, in the example of FIG. 2B, the preload manager system 140 has again selected one or more data groups A 165a to preload for the client computing system 100, but has determined to initially store those selected data groups 165a on the edge server device A. The edge server device A also includes one or more data groups B 165b in this example, whose storage may be initiated by the system 140 concurrently with the selected data groups A for the client computing system 100 (e.g., may be part of a larger group of data groups expected to be used by the client computing system 100, such as if the data groups B are typically used after the data groups A), may be stored by the system 140 at other times (to support other client computing systems, not shown), may be stored on the edge server device A in other manners (e.g., by a manager system, not shown, of the edge server device A, such as without being specific to preloading selected data groups on a particular client computing system), etc.

Thus, in the example of FIG. 2B, the preload manager system 140 has selected at least data group(s) A and possibly data group(s) B for use with the client computing system 100. For example, the data group A may have been selected based in part on being able to fit within the storage capacity of the browser data storage cache 130a or for other reasons, and data groups B may optionally be selected as alternative or additional data groups that may be used by the client computing system 100. In this example, the selected data groups have been stored on the edge server device A, such as to enable those data groups to be provided from the edge server device A to the client system 100. In some embodiments, the preload manager system 140 may additionally initiate the storage of one or more of the data groups that are present on the edge server device A to the client system 100, whether at or near the same time of initiating the storage of those data groups on the edge server device A, or instead at a later time. Alternatively, in other embodiments, the preload manage system 140 may instead not initiate the transfer of data groups between the edge server device A and the client system 100, instead allowing a later request by the client system 100 to initiate access to particular selected data groups that are stored on the edge server device A.

As discussed in greater detail elsewhere, the edge server device A may be selected for use with respect to the client system 100 in various manners, including by the preload manager system 140 in a manner specific to the client system 100. For example, the preload manager system 140 may use information about a current and/or predicted location of the client system 100, and select the edge server device A based at least in part on a location of the edge server device A being proximate to that current and/or predicted location of the client system 100 (e.g., being the closest edge server device to that current and/or predicted client system location). In other embodiments and situations, a particular edge server device may instead be selected using other factors, whether instead of or in addition to a current and/or predicted location of the client system, such as network bandwidth that is currently available or predicted to be available between an edge server device and the client system, a particular computing load that is currently present or predicted to be present on the edge server device, a particular computing load that is currently present or predicted to be present on the client system, etc.

In addition, the determination by the preload manager system 140 of whether or not to use an edge server device to store selected data groups, and/or to preload data groups directly on a client system, may be made in various manners in various embodiments. For example, in some embodiments and situations, no edge server devices may be available, and if so the techniques described with respect to FIG. 2B may not be used in such embodiments. Alternatively, in some embodiments and situations, a particular client computing system may not have local storage or a local storage cache available to use for preloading data, and if so, the described techniques of FIG. 2A may not be used in such embodiments. In addition, even in embodiments in which both local storage cache functionality and edge server device functionality are available, the preload manager system 140 may select to use one or both of such functionality types in various manners, including based on current or predicted capabilities available to a client system and/or available from a particular edge server device, including network bandwidth, location, load, etc. For example, if connectivity is currently available to a client system 100 but is predicted to not be available at a later time at which access to selected data groups may be used, the preload manager system 140 may elect to preload the selected data groups directly on the local storage of the client system, such as in a data storage cache portion of that local storage. Conversely, if connectivity is not currently available to a client system but is predicted to be available at a later time, the preload manager system 140 may currently initiate the storage of selected data groups on a edge server device proximate to the client system, and may optionally further initiate the preloading of the selected data groups from that edge server device to that client system at a later time at which connectivity is restored. It will be appreciated that a variety of other factors may similarly be used in other embodiments.

It will be appreciated that the examples of FIGS. 2A and 2B are provided for illustrative purposes, and that the invention is not limited by the details discussed with respect to those examples.

Figure 3:
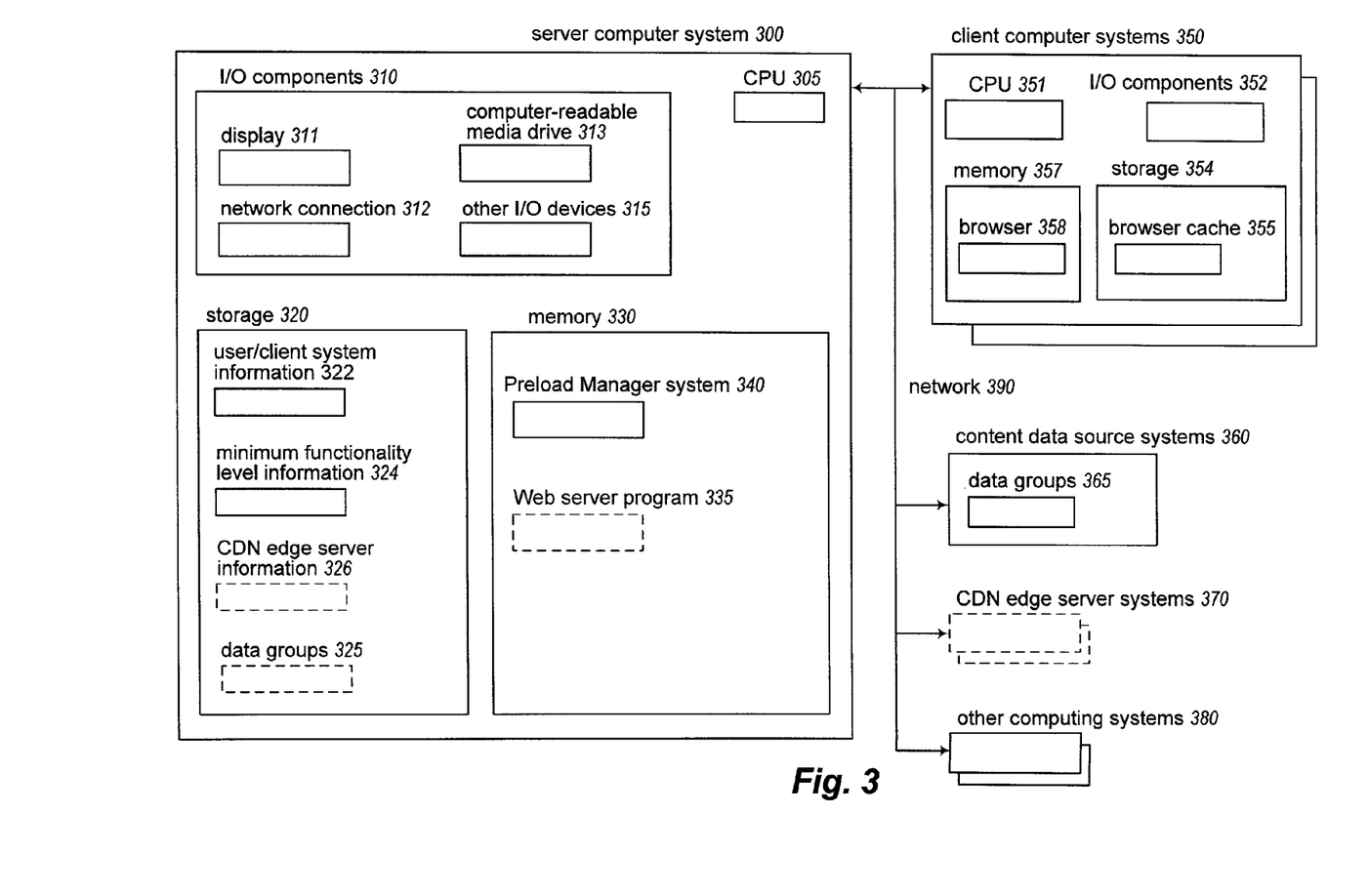
FIG. 3 is a block diagram illustrating an example embodiment of a computing system configured to provide a data preload manager system that manages preloading of data for supported client systems.

FIG. 3 is a block diagram illustrating an example embodiment of a computer system suitable for performing techniques to manage the preloading of data for supported client systems. In particular, FIG. 3 illustrates a server computer system 300 suitable for executing an embodiment of a data preload manager system 340, as well as various computer systems 350, content data source systems 360, optionally edge server devices 370, and other computing systems 380. In the illustrated embodiment, the computer system 300 has components that include one or more hardware CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the computer system 300 may have more or less components than are illustrated, and the local storage 320 may optionally be provided by one or more non-volatile storage devices that are included within or otherwise locally attached to the computer system 300.

In addition, the illustrated client computer systems 350 have components similar to those of computer system 300, including a CPU 351, I/O components 352 (although particular components are not illustrated), storage 354, and memory 357. The other content data source systems 360, edge server devices 370, and other computing systems 380 may also each include similar components to some or all of the components illustrated with respect to computer system 300, but such components are not illustrated in this example for the sake of brevity. The client computer systems 350 each include one or more browser cache 355 portions of the local storage 354, and each includes a browser program 358 executing in memory 357, although in other embodiments one or both of these components may not be present on some or all client systems. Furthermore, a particular client computer system 350 may have more or less components than are illustrated, and the local storage 354 may optionally be provided by one or more non-volatile storage devices that are included within or otherwise locally attached to that client computer system 350.

An embodiment of a data preload manager system 340 is executing in memory 330 of computer system 300, such as to include software instructions that, when executed by the CPU 305, program or otherwise configure the computer system 300 to perform automated operations to provide some or all of the described techniques. In addition, an application program 335 is executing in memory 330 (which in this example embodiment is a Web server program), optionally in affiliation with (or integrated with) the system 340, although in other embodiments the system 340 may support one or more software programs and/or systems over the network 390 (e.g., one or more content data source systems 360 and/or one or more edge server devices 370), or instead the system 340 may operate independently of any such software programs and systems. In this example embodiment, the data preload manager system 340 includes functionality related to managing the preloading of subsets of a plurality of data groups (not shown) for supported client systems, and is further optionally configured to interact with client computer systems 350 and/or other systems and devices over the network 390 (e.g., via the Internet and/or the World Wide Web, via a private cellular network, etc.). The other systems 350, 360, 370 and/or 380 may also each be executing various software as part of interactions with the system 340.

Various information related to the operation of the data preload manager system 340 and/or application program 335 may be stored in storage 320, such as information 322 about particular client systems and/or users, information 324 about one or more particular configured minimum functionality levels, optional information 326 about any of the optional edge server systems 370 that are available, and optionally particular data groups 325 that may be preloaded to particular client systems, such as in a manner similar to that described with respect to FIGS. 2A-2B and elsewhere. Additional details regarding operations of the system 340 in particular embodiments are described in greater detail elsewhere.

It will be appreciated that systems 300, 350, 360, 370 and 380 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a computer system or computing system or other device may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computer systems via inter-computer communication. Thus, in some embodiments, some or all of the described techniques may be performed by hardware means that include one or more processors and/or memory and/or storage when configured by one or more software programs (e.g., by the system 340) and/or data structures (e.g., defined minimum functionality level information 324), such as by execution of software instructions of the one or more software programs and/or by storage of such software instructions and/or data structures. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
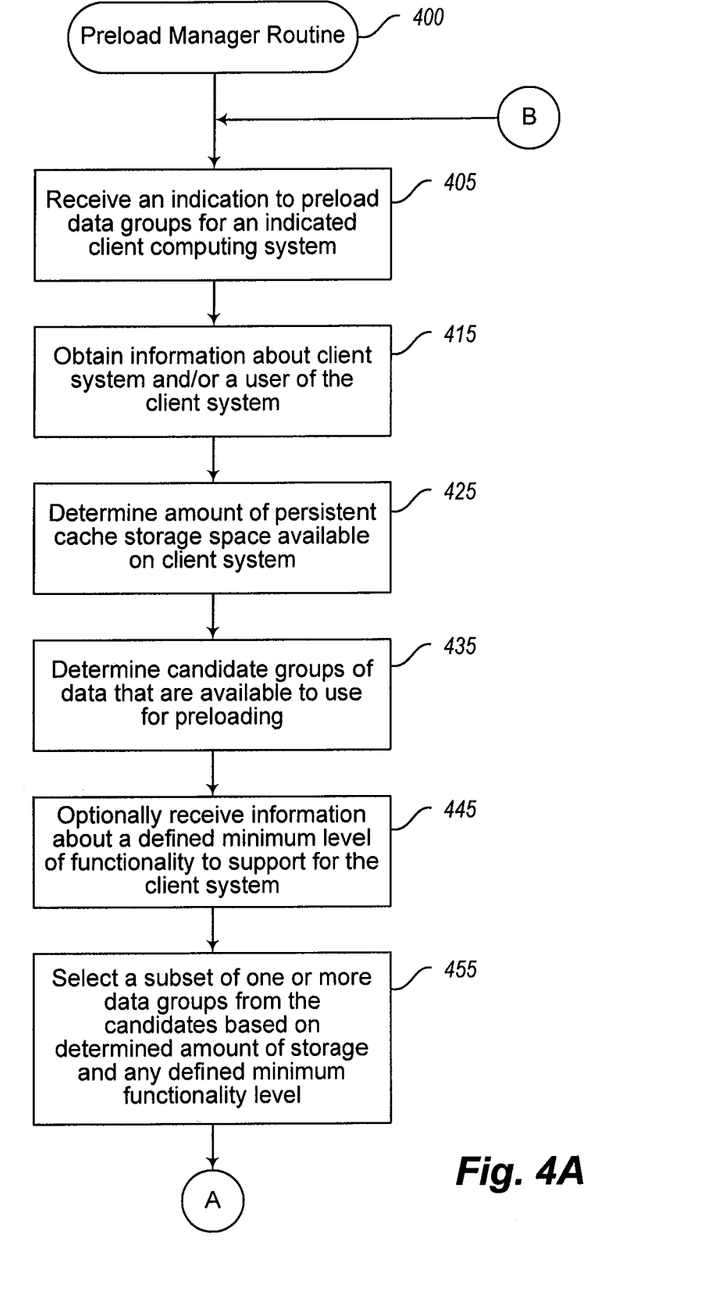
FIGS. 4A-4B illustrate an example embodiment of a flow diagram for a preload manager Routine.
Figure 4B:
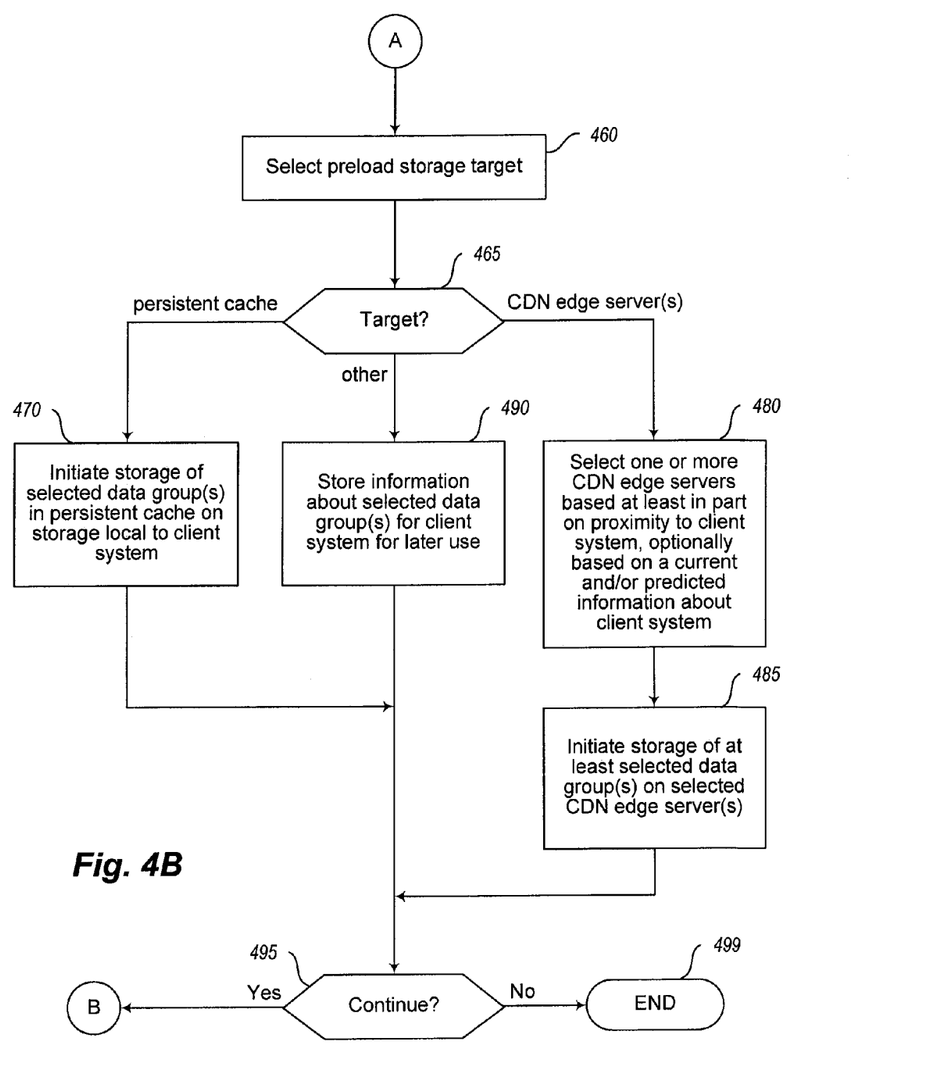

FIGS. 4A-4B are a flow diagram of an example embodiment of a Preload Manager routine 400. The routine may be provided by, for example, execution of the preload manager system 140 of FIG. 1 and FIGS. 2A-2B, and/or the preload manager system 340 of FIG. 3, such as to manage the preloading of data for supported client computing systems in defined manners, as well as to perform other types of actions in some situations. In this example embodiment, the routine manages access to data groups available from one or more data source systems (whether data source systems external to the preload manager system, or one or more data source systems with which the routine 400 is integrated), although the described techniques may be used in other manners in other embodiments. In addition, the illustrated embodiment of the routine performs preloading activities for a single client computing system at a time, although in other embodiments, particular data groups may be selected and preloaded on multiple related client computing systems at a single time.

In the illustrated embodiment, the routine begins at block 405, where an indication is received to preload data groups for an indicated client computing system. The routine continues to block 415 to obtain information about the client system and/or a user of the client system, such as by retrieving the information from storage, by receiving the information in block 405, by interacting with the client system and/or user, etc. In the illustrated embodiment, the routine continues to block 425 to determine an amount of persistent cache storage space available on the client system, such as from the information obtained in block 415, based on a particular type of cache storage space that is used that has a defined amount of space, by initiating creation of a particular cache on the client computing system that has a requested amount of space, by querying the client system for information, etc. The amount of available space may be used to enable selection of particular data groups in a manner that is based in the illustrated embodiment at least on part on that amount of cache storage space—in other embodiments, the determination and selection of particular data groups may be performed in a manner without using such a determination of cache storage space available (e.g., if a given amount of storage space is expected to always be available, if the data groups to be selected are expected to be less than any amount of available storage space, etc.). In embodiments in which the amount of persistent cache storage space is determined and used, the amount may be the total amount of cache storage space that is available (e.g., for a particular data source, for all data sources, etc.), or instead may be based at least in part on a current amount of space that remains available after other data is stored.

After block 425, the routine continues to block 435 to determine candidate groups of data that are available to use for preloading. For example, if the routine 400 is executed with respect to a particular content data source system that provides particular types of content (e.g., Web pages for one or more Web sites, particular audio/video files, etc.), the candidate data groups may include all data available from the one or more content data source systems, or may instead include a particular subset of that available data (e.g., with respect to a particular Web site, such as for data groups corresponding to one or more particular Web pages that are commonly used; with respect to audio/video files, one or more of the most popular or commonly accessed files; etc.). In some embodiments, the determination of candidate data groups may be performed at least in part in a manner specific to the client system and/or its user(s), while in other embodiments the determination of candidate data groups is performed in a manner that is not specific to the client system or its user(s).

After block 435, the routine continues to block 445 to optionally obtain information about a defined minimum level of functionality to support for the client system, such as with respect to a particular type of data that is available and/or a particular content data source system that is being used, as described in greater detail elsewhere. After block 445, the routine continues to block 455 to select a subset of one or more of the data groups from the candidates based on the determined amount of storage and any defined minimum functionality level information. As described in greater detail elsewhere, in some embodiments the subset selection may be performed in a manner specific to the client system and/or its user(s), including using any preference information, information about prior interactions of the user and/or client system, predictions about future interactions by the user and/or client system, etc., while in other embodiments the selection of the data groups of the subset is performed in a manner that is not specific to the client system or its user(s). Similarly, in some embodiments, one or both of the determined amount of storage and defined minimum functionality level may not be used as part of the subset selection.

After block 455, the routine continues to block 460 to select a preload storage target to use. In the illustrated example, only one target is selected at a given time, although in other embodiments particular selected data groups may be stored on multiple targets. In addition, as described in greater detail elsewhere, a variety of factors may be used to select a particular preload storage target to use, including in a manner specific to a particular client system, such as to determine whether to use a local storage cache on the client system or to use storage accessible and proximate to the client system (e.g., on a particular selected edge server device).

After block 460, the routine continues to block 465 to determine if the selected storage target is a persistent storage cache on the client system. If so, the routine continues to block 470 to initiate the storage of the selected data groups in the persistent cache on the storage local to the client system, such as by performing the transmission of the selected data groups to the client system, by interacting with the client system to initiate or control the storage of the selected data groups in the cache, by initiating a separate content data source system to transmit or otherwise store the selected data groups in the persistent cache, by initiating the client system to take action to retrieve and store the selected data groups in the persistent cache, etc.

If it is instead determined in block 465 that the selected storage target is not the persistent cache local to the client system, the routine instead determines in block 465 if the selected target is one or more edge server devices. If so, the routine continues to block 480 to select one or more particular edge server devices to use based at least in part on their proximity to the client system, although in other embodiments edge server devices may be selected in manners that are not based on proximity to client systems. As discussed in greater detail elsewhere, the selection of particular edge server devices may further be performed in some embodiments in a manner specific to the client system, including based on a current and/or predicted location of the client system, as well as one or more other types of information specific to the client system. After block 480, the routine continues to block 485 to initiate the storage of at least the selected data groups on the selected one or more edge server devices.

If it is instead determined in block 465 that the selected target is not one or more edge server devices, the routine continues instead to block 490 to store information about the selected data groups for the client system for later use. As one example, in some embodiments the routine 400 may perform preload determinations for multiple different client systems, and then initiate a bulk load of particular selected data groups for multiple client systems to one or more particular edge server devices that are selected for use with those client systems.

After blocks 470, 485, or 490, the routine continues to block 495 to determine whether to continue, such as until an explicit indication to terminate is received. If it is determined to continue, the routine returns to block 405, and otherwise continues to block 499 and ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   receiving, by a configured server computing system, information about a plurality of data groups that are available to provide to a remote client computing system over one or more networks;
   prioritizing, by the configured server computing system, a subset of the plurality of data groups for the client computing system, wherein the prioritized subset includes multiple data groups selected to provide a minimum level of functionality for the client computing system including a default Web page that is not personalized to a user of the client computing system;
   initiating, by the configured server computing system, preloading of the multiple data groups to storage local to the client computing system, and wherein other of the plurality of the data groups that are different from the multiple data groups are not preloaded to the storage local to the client computing system; and
   transmitting, by the configured server computing system and while the default Web page is displayed on the client computing system, additional data groups to the client computing system for use in modifying the displayed default Web page to include information personalized to the user of the client computing system.

2. The method of claim 1 wherein the storage local to the client computing system for preloading data groups is a persistent storage cache on the client computing system, and wherein the preloading of the multiple data groups includes storing the multiple data groups in the persistent storage cache.

3. The method of claim 2 wherein the persistent storage cache is configured for use by a web browser program executing on the client computing system.

4. The method of claim 3 wherein the persistent storage cache is a browser cache based on Web Storage technology.

5. The method of claim 2 wherein the persistent storage cache is stored on one or more non-volatile storage devices local to the client computing system, and wherein an amount of storage for preloading data groups in the persistent storage cache is a configured storage size specific to an external data source and is used in the prioritizing of the multiple data groups of the subset.

6. The method of claim 1 wherein the minimum level of functionality for the client computing system is based on being able to display the default Web page, and wherein the prioritizing of the subset of the plurality of data groups includes selecting one or more of the multiple data groups based on those one or more data groups including data elements for use in rendering the default Web page on the client computing system.

7. The method of claim 1 wherein the minimum level of functionality for the client computing system is based on providing access to an initial subset of digital media content included in one or more data files, and wherein the prioritizing of the subset of the plurality of data groups includes selecting one or more of the multiple data groups based on those one or more data groups including the initial subset of the digital media content for the one or more data files.

8. The method of claim 1 wherein the minimum level of functionality for the client computing system is based on providing access to a subset of one or more data files that includes Digital Rights Management ("DRM") information for the one or more data files, and wherein the prioritizing of the subset of the plurality of data groups includes selecting one or more of the multiple data groups based on those one or more data groups including the subset of the one or more data files.

9. The method of claim 1 wherein the initiating of the preloading of the multiple data groups to the storage local to the client computing system includes selecting at least one storage device proximate to the client computing system, and storing at least the multiple data groups on the selected at least one storage device.

10. The method of claim 9 wherein the selected at least one storage device includes one of multiple edge server devices of a content delivery network, and wherein the selecting of the at least one storage device is performed at least in part based on information specific to the client computing system, the information specific to the client computing system including at least one of a current location of the client computing system and a predicted location of the client computing system.

11. The method of claim 9 wherein the selecting of the at least one storage device proximate to the client computing system is based on satisfying one or more of an indicated measure of geographical proximity to the client computing system and of an indicated measure of network proximity to the client computing system.

12. The method of claim 1 wherein the plurality of data groups include one or more data files stored on one or more data source systems, and wherein the configured server computing system executes an automated preload manager system that performs the prioritizing of the subset of the plurality of data groups and the initiating of the preloading of the multiple data groups.

13. The method of claim 1 wherein the default Web page is supplied to a plurality of users and is not personalized to the client computing system or to any users, wherein the preloading of the multiple data groups is performed before the multiple data groups are requested by the client computing system, and wherein the method further comprises, after the preloading of the multiple data groups and while the multiple data groups are in use on the client computing system to display the default Web page to the user, and under control of the client computing system, receiving a request from the client computing system for the additional data groups, and wherein the transmitting of the additional data groups is performed as part of responding to the received request, the additional data groups being part of the plurality of data groups and not being included in the multiple data groups.

14. A non-transitory computer-readable medium having stored contents that cause a computer system to perform a method, the method comprising:
> receiving, by the computer system, information about a plurality of data groups;
> prioritizing, by the computer system, a subset of the plurality of data groups, wherein the prioritized subset includes multiple data groups providing a default Web page that is not personalized and is based at least in part on an amount of storage accessible to a client computing system for preloading data groups for the client computing system;
> initiating, by the computer system, preloading of the multiple data groups to the storage accessible to the client computing system, wherein other of the plurality of the data groups that are distinct from the multiple data groups are not preloaded to the storage accessible to the client computing system; and
> transmitting, by the computer system and after the default Web page is displayed on the client computing system, additional data groups of the plurality to the client computing system with information personalized to a user of the client computing system for further display with the displayed default Web page.

15. The non-transitory computer-readable medium of claim 14 wherein the prioritizing of the subset of the plurality of data groups is further performed for the client computing system to provide a determined minimum level of functionality for the client computing system based on the multiple data groups that includes an ability to display the default Web page.

16. The non-transitory computer-readable medium of claim 15 wherein the storage accessible to the client computing system is a Web Storage browser cache on the client computing system that is associated with a browser program on the client computing system.

17. The non-transitory computer-readable medium of claim 14 wherein the storage accessible to the client computing system is part of a non-volatile storage device attached to the client computing system.

18. The non-transitory computer-readable medium of claim 14 wherein the storage accessible to the client computing system is part of a network device that is selected to support the client computing system.

19. The non-transitory computer-readable medium of claim 18 wherein the network device is selected based at least in part on satisfying one or more indicated measures of geographical proximity to the client computing system.

20. The non-transitory computer-readable medium of claim 18 wherein the network device is selected based at least in part on satisfying one or more indicated measures of network proximity to the client computing system.

21. The non-transitory computer-readable medium of claim 18 wherein the network device is one of multiple edge server devices of a content delivery network and is separated from the client computing system by one or more networks.

22. The non-transitory computer-readable medium of claim 14 wherein the stored contents are software instructions that, when executed, program the computer system to perform the method, wherein the default Web page is supplied to a plurality of client computing systems and is not personalized to any of the plurality, wherein the preloading of the multiple data groups is performed before the multiple data groups are requested by the client computing system, and wherein the transmitting of the additional data groups is performed after use of the multiple data groups to display the default Web page to the user on the client computing system and in response to a corresponding request from the client computing system.

23. A configured computer system, comprising:
> one or more processors; and
> one or more modules that, when executed by at least one of the one or more processors, cause the at least one processor to manage data preloading for a client computing system, the managing of the data preloading including:
>> receiving information about a plurality of data groups;
>> prioritizing a subset of the plurality of data groups, wherein the prioritized subset includes multiple data groups providing a minimum level of functionality for displaying a default Web page that is not personalized for the client computing system;
>> initiating preloading of the multiple data groups to storage accessible to the client computing system, wherein other of the plurality of the data groups that are distinct from the multiple data groups are not preloaded to the storage accessible to the client computing system; and
>> transmitting, and after the default Web page is displayed, additional data groups to the client computing system with personalized information for further display with the default Web page.

24. The computer system of claim 23 wherein the prioritizing of the subset of the plurality of data groups is further performed for the client computing system based at least in part on an amount of storage local to the client computing system for preloading data groups that have not yet been requested by the client computing system.

25. The computer system of claim 24 wherein the storage local to the client computing system is a Web Storage browser cache on the client computing system that is associated with a browser program, and wherein the initiating of the preloading of the multiple data groups includes initiating storage of the multiple data groups in the Web Storage browser cache.

26. The computer system of claim 23 wherein the storage accessible to the client computing system is part of a network device that is selected to support the client computing system.

27. The computer system of claim 23 wherein the one or more modules include software instructions for execution by the at least one processor, wherein the default Web page is supplied to a plurality of client computing systems and is not personalized to any of the plurality, wherein the preloading of the multiple data groups is performed before the multiple data groups are requested by the client computing system, and wherein the additional data groups are personalized to a user of the client computing system and are transmitted after use of the multiple data groups to display the default Web page to the user on the client computing system and in response to a request from the client computing system.

28. The computer system of claim 23 wherein the one or more modules consist of one or more means for performing the managing of the data preloading.

\* \* \* \* \*